(12) United States Patent
Fewkes et al.

(10) Patent No.: US 10,258,957 B2
(45) Date of Patent: Apr. 16, 2019

(54) FLOW REACTOR FOR PHOTOCHEMICAL REACTIONS (71) Applicant: Corning Incorporated, Corning, NY (US)

(72) Inventors: Edward John Fewkes, Corning, NY (US); Clemens Rudolf Horn, Guibeville (FR); Stephan Lvovich Logunov, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/560,046

(22) PCT Filed: Mar. 28, 2016

(86) PCT No.: PCT/US2016/024461
§ 371 (c)(1),
(2) Date: Sep. 20, 2017

(87) PCT Pub. No.: WO2016/154615
PCT Pub. Date: Sep. 29, 2016

(65) Prior Publication Data
US 2018/0071709 A1 Mar. 15, 2018

Related U.S. Application Data

(60) Provisional application No. 62/138,971, filed on Mar. 26, 2015.

(51) Int. Cl.
*B01J 19/12* (2006.01)
*B01J 19/24* (2006.01)

(52) U.S. Cl.
CPC ............. *B01J 19/12* (2013.01); *B01J 19/121* (2013.01); *B01J 19/123* (2013.01); *B01J 19/127* (2013.01);
(Continued)

(58) Field of Classification Search
None
See application file for complete search history.

(56) References Cited

U.S. PATENT DOCUMENTS 4,676,956 A * 6/1987 Mori ...................... B01J 19/122
250/435
5,862,449 A * 1/1999 Bischoff ................. C02F 1/325
422/186.3

(Continued)

FOREIGN PATENT DOCUMENTS

DE 4416069 A1 10/1995
DE 202005019457 U1 3/2006
WO 2010011299 A2 1/2010

OTHER PUBLICATIONS

Du et al; "A Novel Photocatalytic Monolith Reactor for Multiphase Heterogeneous Photocatalysis"; Applied Catalysis A: General; 334 (2008) 119-128.
(Continued)

*Primary Examiner* — Kishor Mayekar
(74) *Attorney, Agent, or Firm* — Gregory V. Bean (57) ABSTRACT

A flow reactor for photochemical reactions comprises an extended flow passage (20) surrounded by one or more flow passage walls (22), the flow passage having a length and a light diffusing rod (30) having a diameter of at least 500 μm and a length, with at least a portion of the length of the rod (30) extending inside of and along the flow passage (20) for at least a portion of the length of the flow passage (20).

15 Claims, 4 Drawing Sheets

(52) U.S. Cl.
CPC ......... *B01J 19/249* (2013.01); *B01J 19/2485*
(2013.01); *B01J 2219/0871* (2013.01); *B01J*
*2219/0892* (2013.01); *B01J 2219/12* (2013.01);
*B01J 2219/2407* (2013.01); *B01J 2219/2428*
(2013.01); *B01J 2219/2438* (2013.01); *B01J*
*2219/2439* (2013.01); *B01J 2219/2448*
(2013.01); *B01J 2219/2453* (2013.01); *B01J*
*2219/2462* (2013.01); *B01J 2219/2479*
(2013.01); *B01J 2219/2487* (2013.01); *B01J*
*2219/2488* (2013.01)

(56) References Cited

U.S. PATENT DOCUMENTS

| | | | |
|---|---|---|---|
| 6,238,078 | B1 | 5/2001 | Hed |
| 8,926,143 | B2 | 1/2015 | Li et al. |
| 2002/0096648 | A1 | 7/2002 | Kaiser et al. |
| 2007/0126341 | A1 | 6/2007 | Kawai |
| 2009/0143588 | A1 | 6/2009 | Werner et al. |
| 2009/0230038 | A1* | 9/2009 | Tanaka .................. A01N 25/00 210/150 |
| 2014/0268815 | A1 | 9/2014 | Li et al. |
| 2016/0116671 | A1* | 4/2016 | Logunov ............... G02B 6/001 362/582 |

OTHER PUBLICATIONS

Fischer; "Industrial Applications of Photochemical Synthesis"; Angew. Chem. Int. Ed. Engl. 17, 16-26 (1978).

International Search Report and Written Opinion of the International Searching Authority; PCT/US2016/024461; dated Jul. 12, 2016; 12 Pages; European Patent Office.

Lin et al; "Development of an Optical Fiber Monolith Reactor for Photocatalytic Wastewater Treatment"; Journal of Applied Electrochemistry (2005) 35: 699-708.

Pfoertner et al; "Photochemistry"; Ullman's Encyclopedia of Industrial Chemistry; 2012; 45 Pages.

* cited by examiner

FLOW REACTOR FOR PHOTOCHEMICAL REACTIONS

CROSS-REFERENCE TO RELATED APPLICATIONS

This application claims the benefit of priority under 35 U.S.C. § 371 of International Patent Application Serial No. PCT/US16/24461, filed on Mar. 28, 2016, which in turn, claims the benefit of priority of U.S. Provisional Application Ser. No. 62/138,971, filed on Mar. 26, 2015, the contents of each of which are relied upon and incorporated herein by reference in their entireties.

FIELD

The disclosure relates to photo flow reactors for chemical reactions, that is, for flow reactions employing light radiation, and in particular, to flow reactors having a flow passage in which a light diffusing rod is disposed.

BACKGROUND

Photochemistry comprises chemical reactions of atoms or molecules that have been electronically excited by absorption of light with wavelength typically in the range of 200 nm to about 700 nm. There are several advantages of this kind of chemistry which can be present individually or in various combinations, depending on the particular reaction(s) at issue: (1) Light may be considered as a highly specific and ecologically clean "reagent"; (2) Photochemical methods can offer less "aggressive" routes in chemical synthesis than thermal ones; (3) Photochemical reactions may contribute to the safety of industrial processes, because they are generally performed at, or below, room temperature; (4) photo-chemically reacting organic compounds do not require any protecting groups; and (5) Many conventional syntheses can be shortened by inserting photochemical reaction steps.

Despite those known advantages, photochemical processes are rare on industrial scale. There are several reasons for the limited use in industry.

One is difficult scale-up. Today the best scale-up is generally to enlarge the lab reactor. Pilot plant experiments are done with a production size lamp and the scale up is then done by adding more lamps to the reactor or adding more reactors, which is very expensive. The reactors vary in the way the lamps are placed, in the relation of lamp power to lamp distance from the reactant(s), and in the number of lamps.

Another limitation is due to economic considerations. Photo reactions consume significant amounts of energy. This energy consumption can be divided into two categories: One part is related to chemistry itself and defined by the quantum yield, which is a constant. The other part is caused by the photoreactor setup. In a typical photoreactor and photoreaction, on average, only 10% of the lamp energy is used in the reaction, while 90% produces heat, which must be extracted from the system by cooling. This is normally done with a cooling jacket in which water is circulating. This increases the energy cost.

Another drawback is the maintenance which has to be performed very regularly, since the life of the lamps is limited (typically to 2000-6000 hours). The exchange of the lamps is typically extremely time consuming, requiring significant manual labor.

A photo reactor offering improvements in scale up or energy efficiency, or maintenance requirements or any combination of these is thus desirable.

SUMMARY

In accordance with the detailed description and various exemplary embodiments described herein, the disclosure relates to a flow reactor for photochemical reactions comprising an extended flow passage surrounded by one or more flow passage walls, the flow passage having a length; and a light diffusing rod having a diameter of at least 500 µm and a length, with at least a portion of the length of the rod extending inside of and along the flow passage for at least a portion of the length of the flow passage. According to one alternative embodiment, the flow reactor can include a thermal control passage divided from the extended flow passage by at least one of the one or more flow passage walls. In any of the embodiments, the rod can comprise glass.

In any of the embodiments, the light diffusing rod can include scattering and/or diffusing nanostructures. These scattering and/or diffusing nanostructures can comprise random air lines.

In another aspect of the present disclosure, in combination with any of the above embodiments, the portion of the length of the rod extending inside of and along the flow passage can be radially surrounded by an outer coating or sheath. The rod has a first index of refraction and the coating or sheath has a second index of refraction and the first index can be at least 0.05 greater than the second index, or at least 0.1 greater than the second index.

The sheath or coating can comprise a chemically resistant material. The chemically resistant material can be or more of PTFE, PFA, and FEP, for example. In embodiments in which the rod is radially surrounded by a sheath, as one alternative sub-embodiment, the sheath and be separable from the rod such that the sheath can remain in position within the flow reactor independently of the rod.

In any of the above embodiments and variations, the flow reactor can further comprise comprising a honeycomb body which contains the extended flow passage. As another alternative, in any of the above embodiments and variations, the flow reactor can further comprise a sandwich structure having a central process fluid layer containing the extended flow passage and two outer thermal control fluid layers positioned on either side of the central process fluid layer.

Also in any of the above embodiments and variations, an inner surface of at least one of the one or more flow passage walls can comprise a scattering or reflective layer thereon or therein. Further in any of the above embodiments and variations, an outer surface of the flow reactor can comprise a scattering or reflective layer thereon or therein.

Still further in any of the above embodiments generally, the one or more flow passage walls can be opaque to visible radiation.

It should be noted that at least certain embodiments according to the disclosure may not have one or more of the above-mentioned properties, yet such embodiments are intended to be within the scope of the disclosure.

BRIEF DESCRIPTION OF DRAWINGS

The accompanying drawings are included to provide a further understanding of the invention, and are incorporated in and constitute a part of this specification. The drawings are not intended to be restrictive of the invention as claimed, but rather are provided to illustrate exemplary embodiments of the invention and, together with the description, serve to explain the principles of the invention.

DETAILED DESCRIPTION

It is to be understood that both the foregoing general description and the following detailed description are exemplary and explanatory only and are not restrictive of the invention as claimed. Other embodiments will be apparent to those skilled in the art from consideration of the specification and practice of the embodiments disclosed herein. It is intended that the specification and examples be considered as exemplary only, with the true scope and spirit of the invention being indicated by the claims.

It is also to be understood that, while in various embodiments described herein, steps of exemplary processes disclosed are recited in a particular order, it is intended that the disclosed process steps may be carried out in any order that one of skill in the art would understand would not significantly change the desired product.

As used herein the articles "the," "a," or "an," mean "at least one," and should not be limited to "only one" unless explicitly indicated to the contrary. "Inside", when used to refer to a light diffusing rod "inside" a flow passage is used to mean that at least a portion of the rod is fully enclosed within at least a portion of the passage, in the radial direction.

Figure 1:
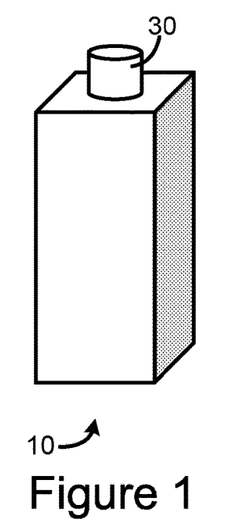
FIG. 1 is a diagrammatic perspective view of a flow reactor according to an embodiment of the present disclosure.

The present disclosure relates, in various embodiments, to a flow reactor for photochemical reactions. FIG. 1 shows a perspective diagrammatic view of a simple flow reactor structure according to an embodiment of the present disclosure. Flow reactor 10 of FIG. 1 includes a light diffusing rod 30 extending inside and along a flow passage within the flow reactor 10. The light diffusing rod 30 is a solid transparent material such as polymer or glass or the like, with glass the presently preferred alternative. Glass is advantaged in that UV radiation, useful for many reactions, significantly degrades most polymers significantly over time, rendering them less transparent, while glass is not so easily damaged.

Figure 2:
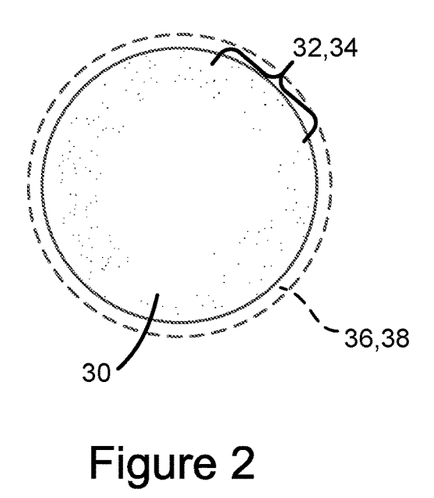
FIG. 2 is a diagrammatic cross-sectional view of an embodiment of a light diffusing rod such as can be used in embodiments of the flow reactors of the present disclosure.

FIG. 2 shows a cross section of an embodiment of light diffusing rod 30 of FIG. 1. In this embodiment of the light diffusing rod 30, the light diffusing rod 30 includes scattering and/or diffusing nanostructures 32 (represented by specks in the drawing some of which are within the bracket) distributed within the rod 30 which cause light propagating along the rod 30 to radiate out through the circumference of the rod 30. Nanostructures 30 can be in the form of random gas voids 34. Methods for preparing structures such as these have been developed and disclosed the by the present inventors and/or their colleagues, as disclosed, for example, in U.S. Pat. No. 8,926,143, hereby incorporated herein by reference in its entirety for purposes of U.S. law. Solid nano-structures may also be used, such as can be provided in the form of a phase-separated glass, for example. The rod 30 of FIG. 2 also optionally has a coating 36 or sheath 38, represented by a dashed line to emphasize that it is an optional variation generally of all or most embodiments and of the embodiment shown. The coating 36 or sheath 38 may be in contact with the rod 30 as in FIG. 2, or, in the case of a sheath 38, can optionally be separated from the rod 30 by an optional space 37, as will be seen in the embodiment to be described below with respect to FIG. 4. Alternative embodiments of the rod 30 include use of either or both of nano- and micro-structure light scattering and/or light diffusing features, such voids, variations in solid composition, surface roughness, and provision of any of these features in the coating or sheath at the interface with the rod 30 (in embodiments where it is in contact with the rod 30), in addition to, or instead of, within the rod 30.

Figure 3:
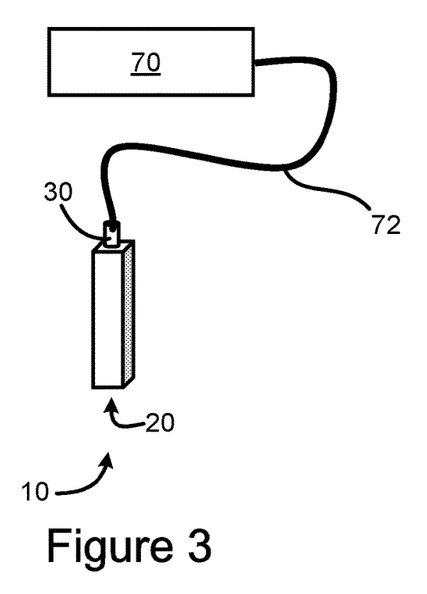
FIG. 3 is a diagrammatic perspective view of a flow reactor according to another embodiment of the present disclosure.

As shown in FIG. 3, light can be supplied to the light diffusing rod 20 from a light source 70, such as a laser or LED source, through an optical fiber 72. A flow passage 20 (not visible in FIG. 3) extends along inside the reactor 10. Light source 70 may also take the form of a sunlight concentrator, or a conventional lamp, or the like. Because the light source is (or light sources are) external to the reactor 10, light sources are easily replaced. Also, thermal management of the reactor 10 is simpler than in reactors having lamps or other heat generating light sources inside or very near the reactor. In embodiments in which optical fiber brings the light to the reactor, the light source can be quite remote from the reactor without significant loss of light energy. Resulting capability of providing electrical isolation of the reactor may be of benefit for certain delicate reaction processes.

Figure 4:
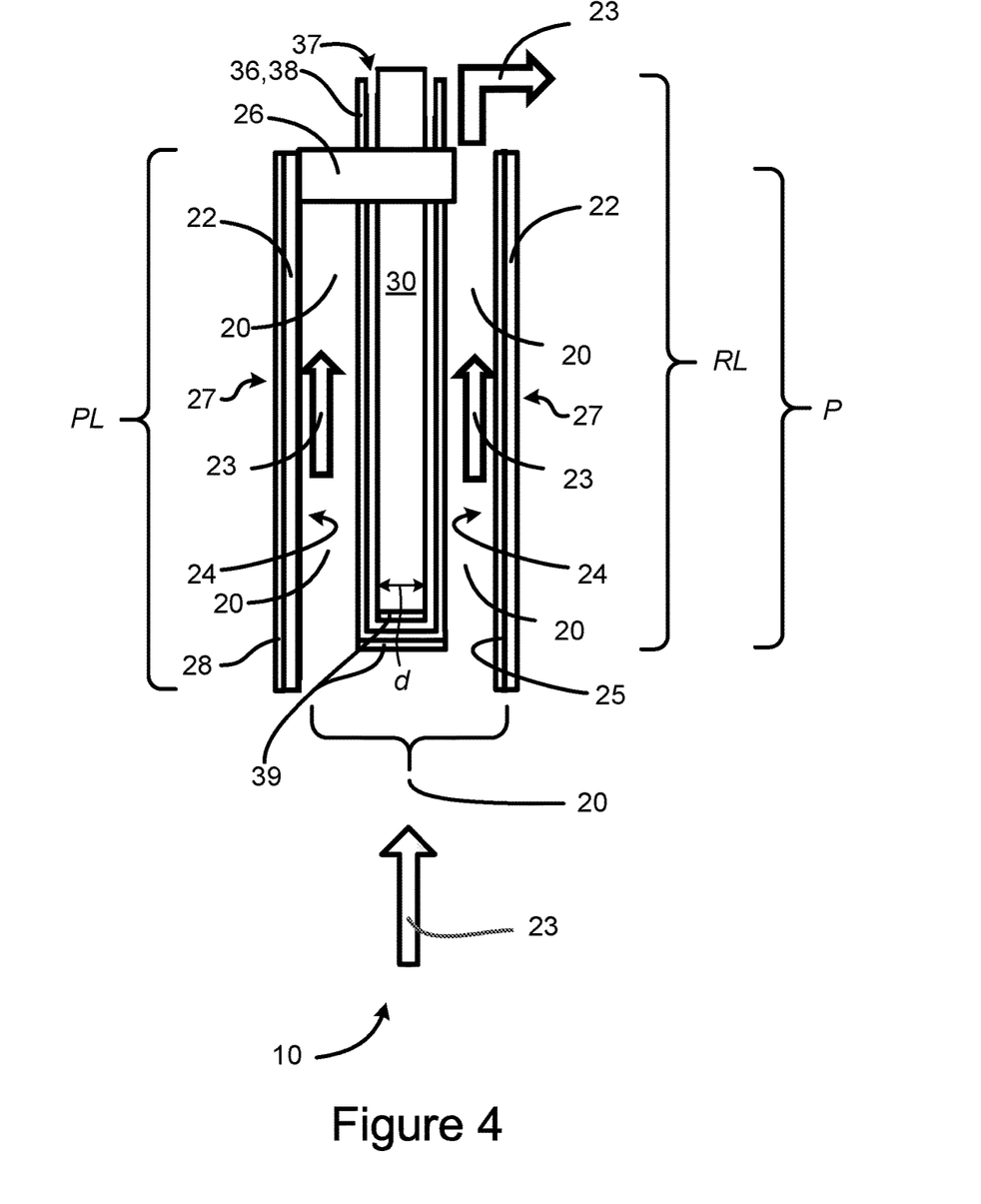
FIG. 4 is a diagrammatic cross sectional view showing additional detail of another embodiment of flow reactor of the present disclosure.

FIG. 4 is a cross-sectional diagrammatic view of an embodiment of a flow reactor 10 of the type depicted in FIGS. 1 and 3. The reactor 10 comprises an extended flow passage 20 surrounded by one or more flow passage walls 22, the flow passage having a length PL. The light diffusing rod 30 has a diameter or cross section d of at least 500 μm and a length RL. Using a rod having a diameter or cross section d of at least 500 μm ensures that the rod can be reasonably well self-supporting and can be manufactured without a protective coating, if desired. As alternative dimensions of the rod, the diameter or cross section d can be larger, such as at least 500 μm, at least 600 μm, at least 700 μm, at least 800 μm, at least 900 μm, at least 1000 μm, or even greater. As an upper limit, the diameter or cross section d can be at most 5 mm, at most 4 mm, at most 3 mm, at most 2 mm, or at most 1 mm, depending on the size rang of the flow passage(s) for which the rod is intended. Larger values of d can provide a larger radiating surface in the flow passage, but the flow passage should not be excessively obstructed.

At least a portion of the length of the rod 30 extends inside of and along the flow passage 20 for at least a portion P of the length PL of the flow passage 20. The rod 30 can be bare glass or bare polymer within the passage 20. Alternatively, the portion P of the length of the rod (30) can be radially surrounded by an outer coating 36 or sheath 38 as shown in FIG. 4. In case a sheath is used, there may optionally be a space 37 between the rod 30 and the sheath 38, as in the embodiment shown. In the alternative embodiment, the sheath 38 or coating 36 is directly in contact with the rod 30 and no space 37 is present.

A mount 26 secures the rod 30 (and the optional sheath 38) within the passage 20. In use, fluid can flow along the fluid passage 20 in the direction indicated by the arrows 23, or in the opposite direction if desired. Also, combination or complex or multiphase flows can be used in reactor embodiments, such as a liquid falling film in combination with a co-current or counter-current gas flow, for example.

In embodiments in which the optional coating 36 or optional sheath 38 is used, the coating or sheath can have good transparency and an index of refraction at least 0.05 less than an index of refraction of the rod 30, or in other words, the rod 30 can have a first index of refraction and the coating (36) or sheath (38) can have a second index of refraction, and the first index can be at least 0.05 greater than the second index, or at least 0.1 greater than the second index, or even more. The second index (the index of the coating 36 or sheath 38) may be in the range of from 1.2 to 1.5, or 1.2 to 1.4, or 1.3 to 1.4, particularly when used with a rod 30 of silica, the index of which (in visible light) is about 1.46. Of course, higher index materials may also be used for the coating or sheath if the material of the rod 30 is a higher index material such as a high index glass. By using a coating or a sheath comprising a material having an index sufficiently below the index of the rod 30, the amount of light emitted by the rod 30 into reactant fluids within the flow passage 20 can exhibit less variability relative to differing refractive indices of reactant fluids within the flow passage 20.

The material of the coating or sheath is also desirably highly resistant to chemicals. Materials such as PTFE, PFA, and FEP can be used for this purpose.

The coating 36 or the sheath 38 can optionally include optical diffusing or scattering structures or materials to help even the distribution of light from the light diffusing rod 30. The coating 36 or the sheath 38 can optionally include catalytic or photo-catalytic materials as well.

An optional coating 25 can be used on the internal surface 24 of the fluid passage 20. The optional coating 25 can be a scattering or reflective layer. The optional coating 25 can also comprise a catalytic and/or a photo-catalytic material. An optional reflective or scattering layer or region 39 may also be positioned at or near an end of the rod 30, or at or near the end of the coating 36 or sheath 38, which end may lie inside the fluid passage 20, as in the embodiment of FIG. 4. This layer or region 39, if at the exterior of the rod, can also comprise a catalytic and/or a photo-catalytic material, if desired. Any of the coatings or layers 25, 39, as well as the coating 36 or sheath 39 can also be provided with one or more photosensitizers and/or photo-initiators either on the respective passage-facing surface or leachable from within the layer, if desired.

In embodiments where the walls 22 are transparent to light, an optional coating 28 may be present on one or more outer surfaces 27 of the reactor 10. The optional coating 28 can be a scattering or reflective layer to help keep light within the reactor 10.

In some embodiments in which a sheath 38 is used, the sheath 38 can be separable from the rod 30 such that the sheath 38 can remain in position within the flow reactor 10, secured by the mount 30 independently of the rod 30, so the rod 30 can be replaced with another rod 30 having differing optical properties, for example. Properties of interest can include light scattering and/or light diffusing features the population and/or properties of which vary along the length of the rod, in order to provide uniformity of illumination along the length, or in order to provide intended non-uniformity of illumination along the length of the rod, as may benefit a given reaction.

Figure 5:
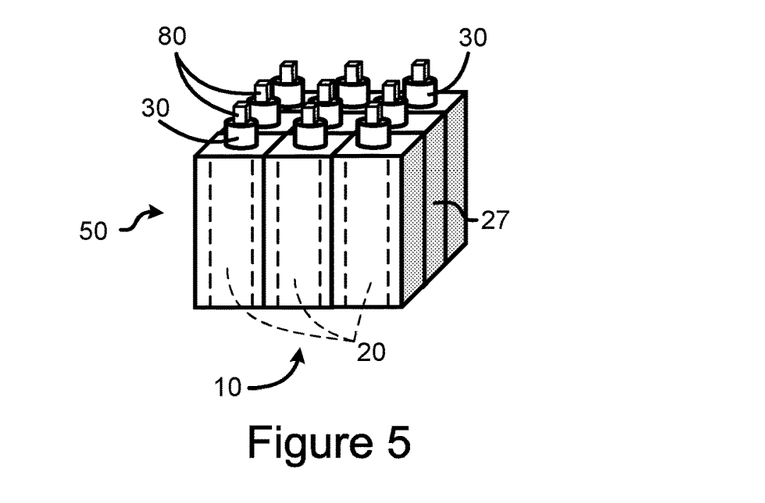
FIGS. 5 and 6 are perspective diagrammatic views of two additional embodiments of flow reactors according to the present disclosure in each of which the reactor includes honeycomb body.
Figure 6:
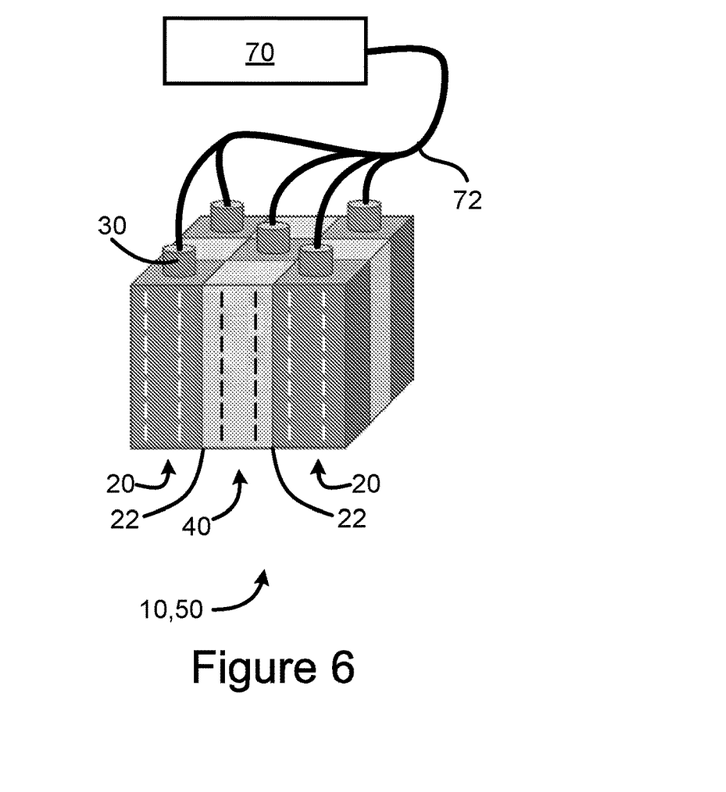

According to another embodiment of the present disclosure as shown in FIG. 5, the flow reactor 10 can include a honeycomb body 50, wherein the honeycomb body 50 contains the extended flow passage 20, or in the example shown, multiple extended passages 20 (shown in dashed lines, representing internal passages within the honeycomb body 50). Multiple light diffusing rods 39 can be used, and each can be supplied with light individually from a semi-conductor laser or LED 80. Alternatively, as in the embodiment shown in FIG. 6, a laser or LED or other light source 70 may feed light into a fiber 72 with many branches to supply light to multiple light diffusing rods 30. The flow passages 20 for reactant fluid may be bordered by thermal control passages 40 for flowing thermal control fluid, with the thermal control passage 40 divided from the flow passage (20) by one of the one or more flow passage walls 22.

Figure 7:
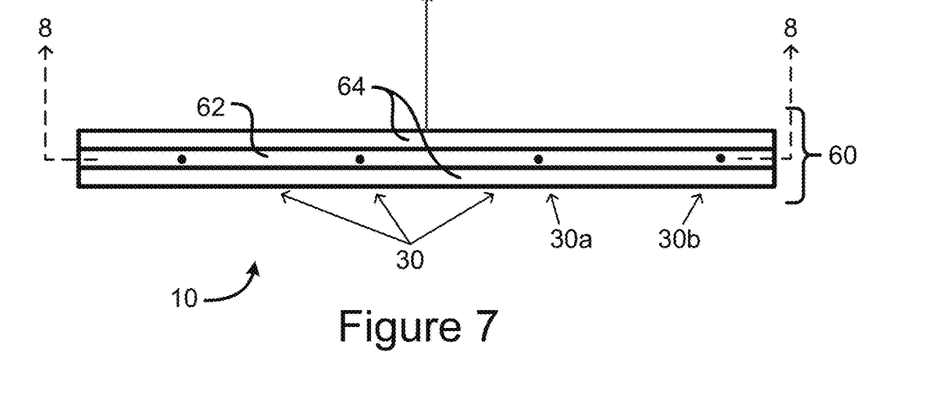
FIG. 7 is a diagrammatic side elevation of another embodiment of reactor according to the present disclosure, the reactor having a three-layer sandwich structure in this embodiment.
Figure 8:
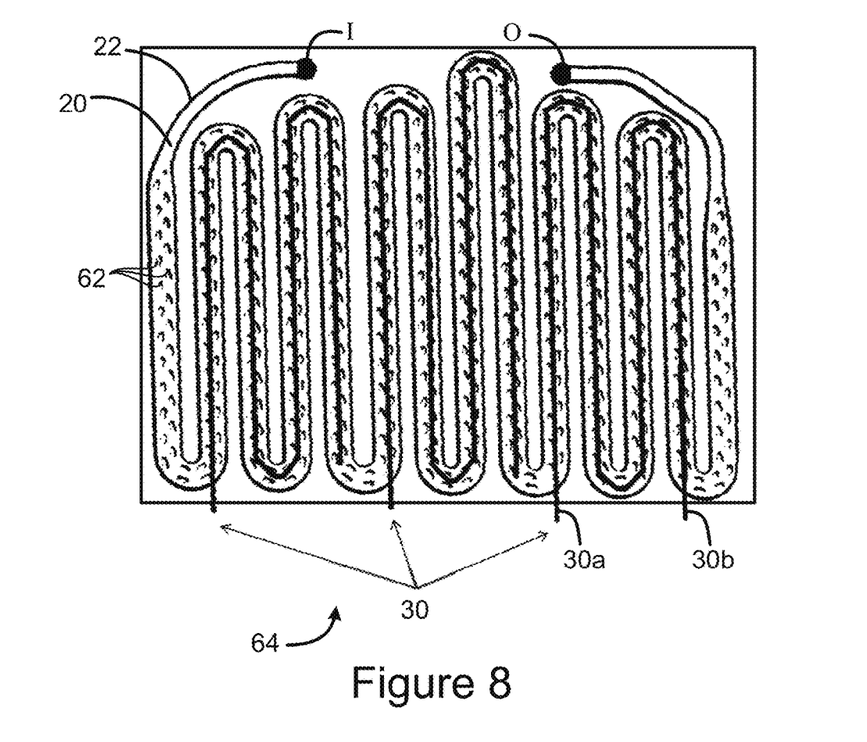
FIG. 8 is a plan view cross section of the reactor of FIG. 7 taken along the line indicated therein.

Still another embodiment of the present disclosure is shown in FIG. 7, with a cross section shown in FIG. 8, taken along the lines shown in FIG. 7. In this embodiment, the flow reactor 10 can include a sandwich structure 60 having a central process fluid layer 62 in which the extended fluid passage 20 (or multiple such passages) for reactant fluid are contained, and two outer thermal control fluid layers 64, where thermal control fluid may be flowed to control the temperature of the reaction in the flow reactor 10, in the manner as known and used in AFR™ flow reactors available from Corning Incorporated, for example. Multiple light diffusing rods 30 may be positioned to provide light for the one or more extended fluid passages within the process fluid layer 62. As seen in FIG. 8, the light diffusing rods 30 may also include bends or curves to follow the fluid passage 20. The bends may be formed during the drawing process by use of a curved path during drawing, or by re-heating a straight light diffusing rod in order to form bends. In this embodiment, the fluid passage contains posts or pillars or obstacles 62 within the fluid path. Fluid input and output ports I and O are also shown.

As another alternative in this and in other embodiments, the light diffusing rods 30 can be positioned such that both ends, 30a and 30b, of a given light diffusing rod 30 extend to the outside of the associated flow passage 20, as shown for the right-most rod 30 of FIG. 8. In this case, only one, or both ends of the rod 30 may be provided with light. Illuminating the rod 30 from both ends can potentially provide more uniform illumination along the length of the rod 30.

In any of the embodiments described herein, the one or more flow passage walls 22 can be opaque to visible radiation, such as if the walls 22 comprise a non-transparent ceramic material, for example. In this case, the light diffusing rods 30 provide well-distributed light within a reactor that otherwise would be incompatible with photo-chemistry, while the ceramic wall material can provide higher thermal conductivity and higher chemical resistance relative to glass wall material.

In any of the embodiments described herein, the light diffusing rod 30 can also be provided with phosphors or other wavelength conversion materials or structures so as to one or more concentrations of one or more wavelengths or wavelength ranges at specific locations within the passage 20 along a given rod 30. Where multiple rods 30 are present serially within a given passage (20), as in the embodiment shown in FIGS. 7 and 8, light sources having differing wavelengths may also be used for the same purpose. As a further alternative, filters or gratings or the like can also be used on or in rod(s) (30) to narrow or control the wavelength of light emitted by the rod (30) and/or to control the distribution of the light emitted by the rod (30) along the rod (30). More than one rod (30) can also be used, in parallel, along a single portion P of a passage (20), if desired.

The methods and/or devices disclosed herein are generally useful in performing any process that involves mixing, separation, extraction, crystallization, precipitation, purification, sterilization, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, and desirably includes a chemical, physical, or biological process or reaction favored in the presence of light, of whatever wavelength, i.e., photoreactions, whether photosensitized, photoinitiated (as in photoinitiated radical reactions), photoactivated, photocatalytic, photosynthetic, or other). A non-limiting list of light-assisted or light-favored reactions of potential interest includes photoisomerizations, rearrangements, photoreductions, cyclizations, 2+2 cycloadditions, 4+2 cycloadditions, 4+4 cycloadditions, 1,3-dipolar cycloadditions, sigmatropic shifts (which could result in cyclisation), photooxidation, photocleavage of protecting groups or linkers, photohalogenations (phtochlorinations, photobrominations), photosulfochlorinations, photosulfoxidations, photopolymerizations, photonitrosations, photodecarboxylations, photosynthesis of previtamin D, decomposition of azo-compounds, Norrish type reactions, Barton type reactions. Further, the following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

It is noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A flow reactor (10) for photochemical reactions, the reactor comprising:
    an extended flow passage (20) surrounded by one or more flow passage walls (22), the flow passage having a length;
    a light diffusing rod (30) having a diameter or cross section of at least 500 µm and a length, at least a portion of the length of the rod (30) extending inside and along the flow passage (20) for at least a portion of the length of the flow passage (20); and
    at least one thermal control passage (40) divided from the extended flow passage (20) by at least one of the one or more flow passage walls (22).

2. The flow reactor (10) according claim 1, wherein the rod (30) comprises glass.

3. The flow reactor (10) according to claim 1, wherein the rod (30) comprises light scattering and/or light diffusing nanostructures (32).

4. The flow reactor (10) according to claim 3, wherein the light scattering and/or light diffusing nanostructures (32) comprise random gas voids (34).

5. The flow reactor (10) according claim 1, wherein said portion of the length of the rod (30) is radially surrounded by an outer coating (36) or sheath (38).

6. The flow reactor (10) according to claim 5, wherein the rod (30) has a first index of refraction and the coating (36) or sheath (38) has a second index of refraction and the first index is at least 0.05 greater than the second index.

7. The flow reactor (10) according to claim 6, wherein the first index is at least 0.1 greater than the second index.

8. The flow reactor (10) according to claim 5, wherein the coating (36) or sheath (38) comprises one or more of glass, PTFE (polytetrafluoroethylene), PFA (perfluoroalkoxy), and FEP (fluorinated ethylene propylene).

9. The flow reactor (10) according to claim 5, wherein the rod (30) is radially surrounded by a sheath (38) and wherein the sheath (38) is separable from the rod (30) such that the sheath (38) can remain in position within the flow reactor (10) independently of the rod (30).

10. The flow reactor (10) according claim 1, further comprising a honeycomb body (50), wherein the honeycomb body (50) contains the extended flow passage (20).

11. The flow reactor (10) according claim 1, further comprising a sandwich structure (60) having a central process fluid layer (62) and two outer thermal control fluid layers (64), wherein the central process fluid layer (62) contains the extended flow passage (20).

12. The flow reactor (10) according claim 1, further comprising a light scattering or light reflective layer (25) on an inner surface (24) of at least one of the one or more flow passage walls (22).

13. The flow reactor (10) according claim 1, further comprising a light scattering or light reflective layer (28) on an outer surface (27) of the flow reactor (10).

14. The flow reactor (10) according claim 1, wherein the one or more flow passage walls (22) are opaque to visible radiation.

15. A flow reactor (10) for photochemical reactions, the reactor comprising:
- an extended flow passage (20) surrounded by one or more flow passage walls (22), the flow passage having a length;
- a light diffusing rod (30) having a diameter or cross section of at least 500 μm and a length, at least a portion of the length of the rod (30) extending inside and along the flow passage (20) for at least a portion of the length of the flow passage (20); and
- a sandwich structure (60) having a central process fluid layer (62) and two outer thermal control fluid layers (64), wherein the central process fluid layer (62) contains the extended flow passage (20).

\* \* \* \* \*

UNITED STATES PATENT AND TRADEMARK OFFICE
CERTIFICATE OF CORRECTION

PATENT NO. : 10,258,957 B2
APPLICATION NO. : 15/560046
DATED : April 16, 2019
INVENTOR(S) : Edward John Fewkes et al.

It is certified that error appears in the above-identified patent and that said Letters Patent is hereby corrected as shown below:

In the Claims

In Column 8, Line 27, Claim 2, after "according" insert -- to --.

In Column 8, Line 35, Claim 5, after "according" insert -- to --.

In Column 8, Line 48, Claim 9, after "according" insert -- to --.

In Column 8, Line 53, Claim 10, after "according" insert -- to --.

In Column 8, Line 56, Claim 11, after "according" insert -- to --.

In Column 8, Line 61, Claim 12, after "according" insert -- to --.

In Column 8, Line 65, Claim 13, after "according" insert -- to --.

In Column 9, Line 1, Claim 14, after "according" insert -- to --.

Signed and Sealed this
Twentieth Day of December, 2022

Katherine Kelly Vidal
*Director of the United States Patent and Trademark Office*